United States Patent [19]

Davison et al.

[11] Patent Number: 5,323,370
[45] Date of Patent: Jun. 21, 1994

[54] CHILDREN'S MUSIC PLAYER WITH CONTROL LOCKOUT

[75] Inventors: Anna M. Davison, Long Beach; Scott D. Goodman, Hermosa Beach, both of Calif.

[73] Assignee: Mattel, Inc., El Segundo, Calif.

[21] Appl. No.: 709,918

[22] Filed: May 31, 1991

[51] Int. Cl.⁵ .................. A63H 3/33; A63H 33/30
[52] U.S. Cl. .................. 369/63; 446/143; 446/408
[58] Field of Search .............. 369/64, 65, 66, 67, 369/30, 31, 62, 63, 12, 24; 360/60; 446/143, 408

[56] References Cited

U.S. PATENT DOCUMENTS

| | | | |
|---|---|---|---|
| D. 263,139 | 2/1982 | Petrie | D14/5 |
| D. 267,662 | 1/1983 | Lambert et al. | D21/112 |
| D. 277,474 | 2/1985 | Miura | D14/6 |
| D. 297,551 | 9/1988 | Ng | D21/112 |
| D. 304,832 | 11/1989 | Murphy | D14/165 |
| D. 309,637 | 7/1990 | Maezono | D21/64 |
| D. 311,006 | 10/1990 | Hino et al. | D14/165 |
| 3,696,217 | 10/1972 | Motoyama et al. | 360/60 |
| 3,748,748 | 7/1973 | Bevan et al. | 369/31 |
| 3,824,472 | 7/1974 | Engel et al. | 369/12 |
| 3,869,718 | 3/1975 | Schmidt | 360/60 |
| 3,972,070 | 7/1976 | Fukayama et al. | 360/137 |
| 4,017,905 | 4/1977 | Convertine et al. | 360/96 |
| 4,152,732 | 5/1979 | Weis et al. | 369/24 |
| 4,373,918 | 2/1983 | Berman | 434/307 |
| 4,521,205 | 6/1985 | Spector | 446/302 |
| 4,669,007 | 5/1987 | Fujishige | 369/63 |
| 4,878,871 | 11/1989 | Noto | 446/302 |

FOREIGN PATENT DOCUMENTS

| | | | |
|---|---|---|---|
| 3710135 | 10/1988 | Fed. Rep. of Germany | 446/142 |
| 2413101 | 8/1979 | France | 446/302 |
| 2591501 | 6/1987 | France | 446/302 |

Primary Examiner—Eugene R. LaRoche
Assistant Examiner—Son Dinh
Attorney, Agent, or Firm—Roy A. Ekstrand

[57] ABSTRACT

A children's music player with control lockout includes a housing supporting a conventional audio music player having a plurality of control arms operable in connection therewith. An on button and an off button are positioned upon the housing to provide access thereto by a child user. The remaining player controls are supported within a control panel having a lockout mechanism utilizing a slide bar which cooperates with locking tabs on the controls to permit adjustment of the controls in one position and preclude adjustment thereof in the lockout position.

15 Claims, 2 Drawing Sheets

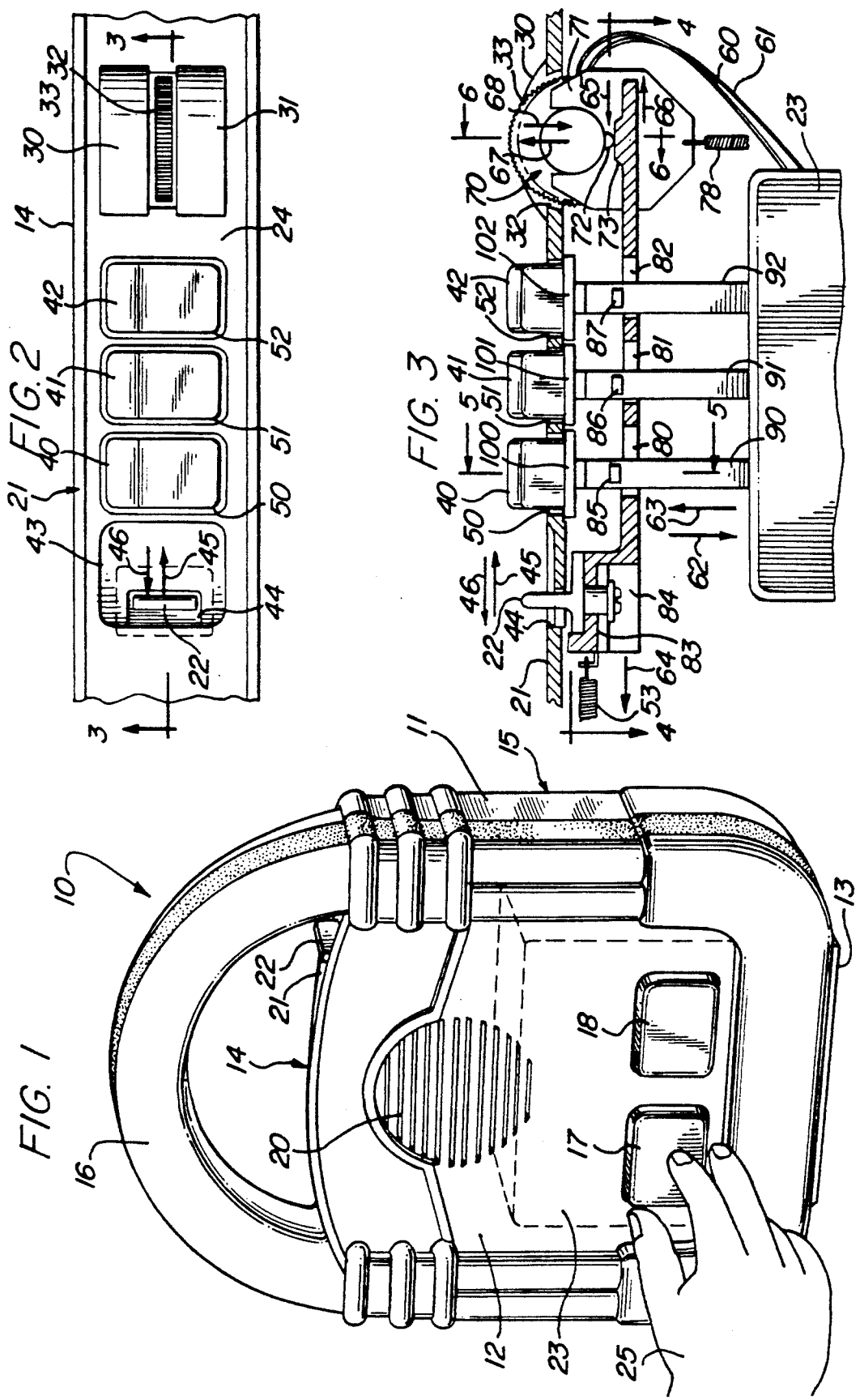

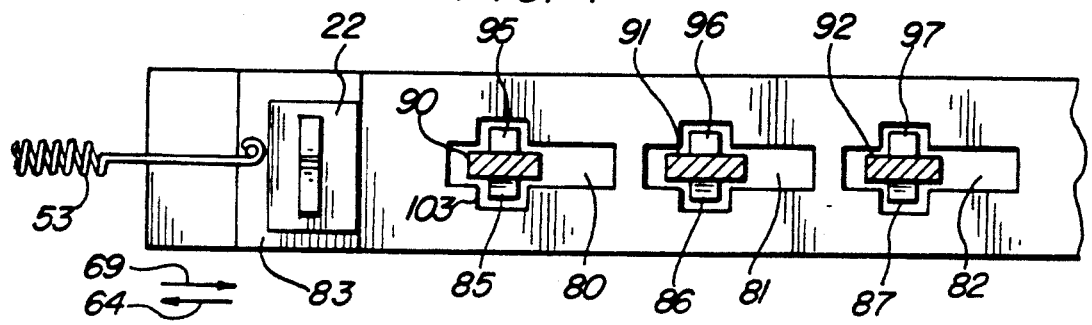
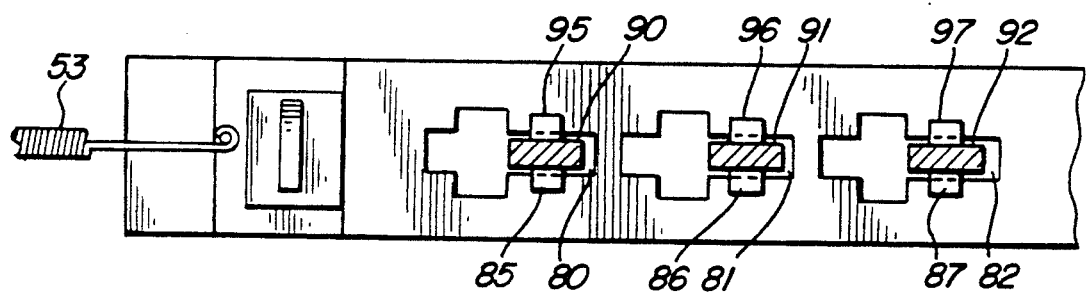
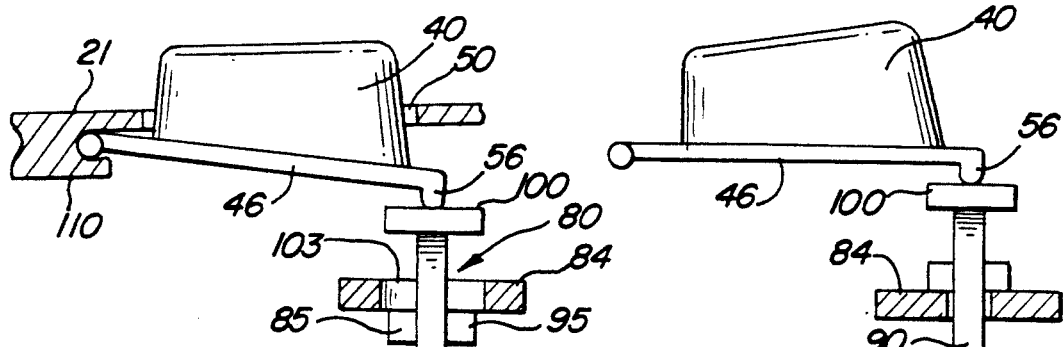
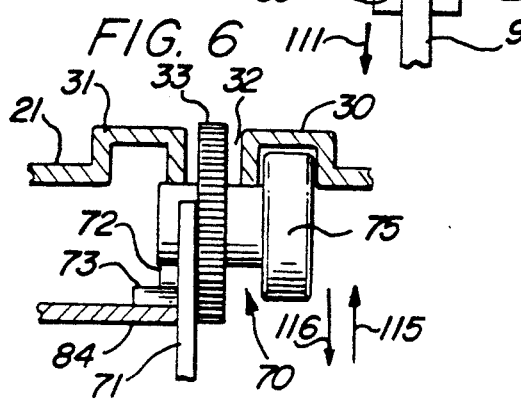
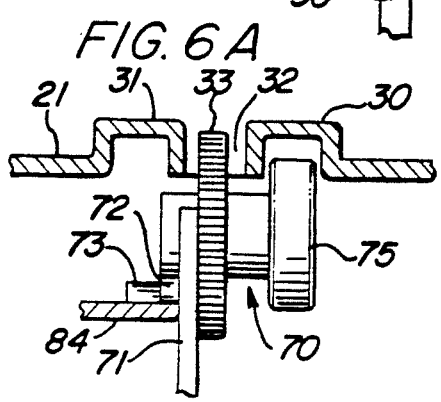

CHILDREN'S MUSIC PLAYER WITH CONTROL LOCKOUT

FIELD OF THE INVENTION

This invention relates generally to music players and particularly to those adapted for use by young children.

BACKGROUND OF THE INVENTION

Music players such as cassette tape players and the recently introduced compact disk players have provided a convenient source of music entertainment for a great variety of users. While the particular structure used in such players vary substantially, all generally include a housing within which a transport mechanism receives the tape or compact disk in an operative installation. Playback apparatus interact with the music bearing medium to convert the information upon the tape or compact disk or other medium to electrical signals which are amplified and applied to one or more speakers to produce sound information such as music. In addition to the transport mechanisms, such players generally include a plurality of user operated controls which permit the user to structure the player operation. Such controls include sound quality controls such as volume, tone, treble, bass and the like together with operative or mode selection controls such as play, record, fast forward, rewind and pause.

The majority of music players produced are more than adequate for use by a variety of older children as well as adults of virtually all ages. However, young children are often also interested in music and music players. However, few, if any, tape or compact disk players are designed for convenient and easy to understand use by younger children. In most cases, the controls are extremely difficult for the young child to manipulate and understand. In addition, younger children often misuse such equipment by, for example, playing the music objectionably loud and so on.

Practitioners in the art have recognized the need for music players which are more easily operated by younger children. In addition, practitioners have addressed the interest of younger children in music making apparatus by producing a variety of music making toys and interactive music players. For example, U.S. Pat. No. 4,521,205 issued to Spector sets forth a SOUND TAPE PLAYER HAVING ANIMATED CHARACTER in which a player for prerecorded sound magnetic tape package in cartridge or cassette format is provided. A three-dimensional character is supported upon the player and interactively operated in response to the music produced from playing the tape.

U.S. Pat. No. 4,878,871 issued to Noto sets forth a TOY FOR CONVEYING PERSONALIZED MESSAGE in which a toy such as a doll or similar figure includes a cavity supporting a cassette player and a battery power mechanism. One or more switches are disposed about the toy and operatively coupled to the tape playing mechanism to operate the mechanism as the toy is manipulated.

French Patent 2,591,501 issued to Barraut sets forth an EDUCATIONAL ANIMATED TOY FOR YOUNG CHILD in which a figurine in the form of a furry animal includes a body having head and appendages and defining an interior cavity. The cavity may be used as a letter box for notes and may contain a cassette tape player coupled to a microphone which protrudes from the body. An electronic control circuit is operatively coupled to the toy figure appendages and is operative in response to appendage manipulation to control the tape player.

French Patent 2,413,101 issued to Ungar sets forth a CHILDREN'S TALKING TOY formed as a doll or soft figure which incorporates a recording appliance and cassette. The cassette is protected within the doll or toy figure body and control knobs are provided for manipulating the tape player.

U.S. Pat. No. 4,017,905 issued to Convertine, et al. sets forth a TOY RECORDER AND PLAYBACK APPARATUS in which a miniature tape recorder for use by children is provided. The recorder is normally incorporated within a toy such as a doll and arranged such that the child may be speak to the toy while recording and thereafter playback or repeat the spoken message. A microphone is provided which is operatively coupled to the recorder and supported within the toy figure. The tape mechanism is operated by a drawstring and spring force motor combination.

U.S. Pat. No. 4,373,918 issued to Berman sets forth an AUDIO-VISUAL CHILD-PARTICIPATING EDUCATIONAL ENTERTAINMENT CENTER in which a housing supports an audio-visual device. The device includes a screen upon which visual images are projected, an animated audio-visual feature, a kit containing different types of appliques and a switch to stop and restart the audio-visual feature at will.

German Patent DE 3710135-A issued to Hoff sets forth a CHILD'S TELEPHONE HANDSET WITH CASSETTE COMPARTMENT in which a toy telephone includes a cassette recorder and playback device. Tape information is provided which permits the child user to interactively converse with the tape conversation being played.

In addition to the foregoing described utility patents, a variety of design patents have issued showing different aesthetic appearances for children's tape players or toy tape players and recorders. By way of example, U.S. Pat. No. Des. 267,662 issued to Lambert, et al., U.S. Pat. Des. No. 277,474 issued to Miura, U.S. Pat. Des. No. 297,551 issued to Ng, U.S. Pat. Des. No. 263,139 issued to Petrie, U.S. Pat. Des. No. 304,832 issued to Murphy, U.S. Pat. Des. No. 309,637 issued to Maezono, and U.S. Pat. Des. No. 311,006 issued to Hino, et al. are representative of typical children's music players or toy music playing devices.

While the foregoing described prior art devices have provided children with music players of different types, there remains a need in the art for a player more realistically configured and operated to be used by young children.

SUMMARY OF THE INVENTION

Accordingly, it is a general object of the present invention to provide an improved children's music player. It is a more particular object of the present invention to provide an improved children's music player having a limited control access by the child user.

In accordance with the present invention, there is provided a children's music player comprises: a housing defining an interior cavity; an audio player for playing recorded audio information and having a plurality of control members; an on/off control supported upon the housing and operative to activate and deactivate the audio player; and lockout means operative upon the plurality of control members to render the control members inoperable by the child user.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

FIG. 1 sets forth a front perspective view of a children's music player constructed in accordance with the present invention;

FIG. 2 sets forth a partial section view of the control panel portion of the present invention children's music player;

FIG. 3 sets forth a section view of the present invention children's music player taken along section lines 3—3 in FIG. 2;

FIGS. 4 and 4A set forth section views of the present invention children's music player taken along section lines 4—4 in FIG. 3;

FIGS. 5 and 5A set forth section views of the present invention children's music player taken along section lines 5—5 in FIG. 3; and FIGS. 6 and 6A set forth section views of the present invention children's music player taken along section lines 6—6 in FIG. 3.

DESCRIPTION OF THE PREFERRED EMBODIMENT

FIG. 1 sets forth a front perspective view of a children's music player constructed in accordance with the present invention and generally referenced by numeral 10. Player 10 includes a housing 11 preferably formed of a molded plastic material or the like. Housing 11 defines a front face 12, a rear face 15, a bottom face 13 and a top face 14. Housing 11 further defines a generally arced handle 16. A pair of control buttons 17 and 18 are supported upon front face 12 of housing 11. A speaker grill 20 defines a plurality of elongated apertures extending through front face 12. A music player 23 shown in dashed line representation in FIG. 1 is supported within housing 11 and, in accordance with conventional fabrication techniques, is operative to receive a conventional recorded audio-tape or cassette by conventional apparatus (not shown). Housing 11 further includes a control panel 21 (better seen in FIG. 2) supported upon top surface 14. As is set forth below in greater detail, control panel 21 includes a control lockout button 22, the operation of which is set forth below in greater detail. Player 10 further includes a conventional speaker (not shown) fabricated in accordance with conventional fabrication techniques and generally supported within housing 11 behind speaker grill 20.

In operation, music player 23 is operative to receive and operatively support a recorded music segment such as a conventional audio cassette and to reproduce the musical sounds recorded thereon through speaker grill 20. Buttons 17 and 18 are operatively coupled to music player 23 and provide the only control button accessible and operable by user 25. Button 17 comprises an on button while button 18 comprises an off button. Thus, the user operating button 17 causes music player 23 to play the recorded music on the cassette player supported therein and produce music sounds through speaker grill 20. Conversely, the pressing of off button 18 by user 25 interrupts the operation of music player 23 and terminates the production of musical sounds through speaker grill 20. Thus user 25 is able to choose between music on and music off conditions of music player 25 within player 10. In accordance with an important aspect of the present invention which is better seen in FIGS. 2 and 3, a plurality of additional controls of the type generally found on cassette players are supported upon control panel 21 within top 14 of housing 11. The operation of control panel 21 and the additional controls disposed thereon is shown and described below in greater detail. However, suffice it to here that control panel 21 supports a lockout button 22 which in accordance with the figures and descriptions set forth below permits the adult user to access and operate the remaining controls disposed upon control panel 21 and thereafter render such controls inoperative and thus incapable of readjustment by child user 25.

Thus, in accordance with an important aspect of the present invention, player 10 provides the facility by which an adult or other supervisory person may temporarily defeat the lockout feature operative upon all controls except buttons 17 and 18 and thereby preset and manipulate the desired controls. Once lockout is again implemented by the proper position of lockout button 22, player 10 responds solely to on button 17 and off button 18 in the hands of child user 25. Thus, the above-mentioned problems of excessive and ineffective control manipulation as well as abuse such as excessive volume frequently encountered by child users of music players is avoided.

FIG. 2 sets forth a partially sectioned top view of top portion 14 of housing 11. A control panel 21 is supported upon top 14 and defines a plurality of generally rectangular apertures 50, 51 and 52 in a linear arrangement. A pair of curved generally cylindrical raised shoulders 30 and 31 are parallely spaced upon and extend upwardly from control panel 21. Control panel 21 further defines an elongated slot 32 extending between raised shoulders 30 and 31. By means set forth below in greater detail, a volume control comprising a generally disk-shaped thumb wheel 33 is supported beneath control panel 21 and extends upwardly into slot 32 between shoulders 30 and 31. Control panel 21 further defines a generally rectangular recess 43 having defined therein a rectangular aperture 44. A lockout button 22, the operation of which is set forth below in greater detail, is supported beneath control panel 21 and is movable in the directions indicated by arrows 45 and 46. A plurality of depressible control buttons 40, 41 and 42 are resiliently supported beneath control panel 21 and extend upwardly through apertures 50, 51 and 52 respectively.

In operation, control buttons 40, 41 and 42 are representative of the typical secondary controls found on music players such as audio-cassette players and the like. For example, buttons 40, 41 and 42 may comprise control buttons to operate stop/eject, play and fast forward mechanisms within music player 23. Volume control thumb wheel 33 is operative to control the audio volume of sound produced by music player 23 and outputted through speaker grill 20. By means set forth below in greater detail, lockout button 22 is slidably movable beneath control panel 21 in the directions indicated by arrows 45 and 46 to render buttons 40 through 42 and volume control 33 either operable or inoperable as desired. In its preferred form, lockout button 22 is spring-biased in the direction indicated by arrow 46 which, as is better seen in FIG. 3 below, corresponds to the lockout mode of operation in which buttons 40 through and volume control 33 are inoperative. Thus, with lockout button 22 left unattended, a return spring 53 (seen in FIG. 3) is operative upon lockout button 22 and its associated mechanisms to render controls 40 through 42 and volume control 33 inoperative.

In accordance with an important aspect of the present invention, the bias force of spring 53 may be overcome by the adult or supervisory operator of player 10 by simply forcing lockout button 22 in the direction indicated by arrow 45. By means set forth below in greater detail, the lateral movement of lockout button 22 to the position shown in FIG. 2 releases the locks operative upon buttons 40 through 42 permitting depression thereof and conventional operation of player 10. Similarly, by means also set forth below in greater detail, the movement of lockout button 22 to the position shown in FIG. 2 raises volume thumb wheel 38 above raised shoulders 30 and 31 and permits manipulation of thumb wheel 33 to adjust the volume of player 10. Once again, following the desired control operation, the release of lockout button 22 returns control panel 21 to the locked condition leaving child user 25 restricted solely to operation of on button 17 and off button 18 (seen in FIG. 1).

FIG. 3 sets forth a section view of control panel 21 taken along section lines 3—3 in FIG. 2. Music player 23 is, as mentioned above, constructed in accordance with conventional fabrication techniques and includes conventional means (not shown) for receiving a conventional audio recording such as a conventional cassette (not shown) and for playing the music disposed thereon. Music player 2S includes a plurality of control arms 90, 91 and 92 extending upwardly from player 23 and terminating in end portions 100, 101 and 102 respectively. Correspondingly, control panelrectdefines a plurality of rectangular apertures 50, 51 and 52 generally aligned with control arms 90, 91 and 92. A plurality of control buttons 40, 41 and 42 define flange portions 46, 47 and 48 and extend upwardly through apertures 50, 51 and 52 respectively. As is better set forth below, control buttons 40, 41 and 42 are pivotally supported by control panel 21 and are maintained in the positions shown by the extensions of flanges 46, 47 and 48 beyond apertures 50, 51 and 52 respectively.

A volume control carriage 71 is slidably supported within housing 11 by conventional fabrication means (not shown) and is movable in the directions indicated by arrows 67 and 68. A return spring 78 is coupled to volume control carriage 71 and urges carriage 71 downwardly in the direction indicated by arrow 68. Carriage 71 supports a conventional volume control 70 having a thumb wheel 33 rotationally operable to control the setting of volume control 70. Carriage 71 further includes a downwardly extending tab 72.

A slide bar 84 defines an elongated generally rectangular planar member having a raised pedestal 83 extending upwardly therefrom. A lockout button 22 is secured to pedestal 83 and extends upwardly through aperture 44 in control panel 21. In accordance with conventional fabrication techniques (not shown) slide bar 84 is slidably supported within housing 11 and is movable in the directions indicated by arrows 45 and 46. A spring 53 is coupled to pedestal 83 of slide bar 84 and is operative to urge slide bar 84 in the direction indicated by arrow 64. As is better seen in FIGS. 4 and 4A, slide bar 84 defines a plurality of cruciform shaped apertures 80, 81 and 82 through which control arms 90, 91 and 92 extend respectively. As is also better seen in FIGS. 4 and 4A, control arm 90 defines a pair of outwardly extending tabs 85 and 95 while control arms 91 and 92 define outwardly extending tabs 86 and 96 and 87 and 97 respectively. As is set forth below in greater detail, tabs 85 through 87 and 95 through 97 cooperate with cruciform slots 80 through 82 to permit control arms 90 through 92 to be movable in the direction indicated by arrow 62 solely when slide bar 84 is positioned in the manner shown in FIG. 3. The cooperation of control arms 90 through 92 and slots 80 through 82 is set forth below in greater detail in FIGS. 4 and 4A. However, suffice it to note here that control buttons 40 through 42 may be pressed downwardly to actuate control arms 90 through 92 so long as slide bar 84 is positioned in the manner shown in FIG. 3 because tabs 85 through 87 and 95 through 97 may pass downwardly through the larger dimensioned portion of cruciform apertures 80 through 82 respectively. Alternatively, with slide bar 84 moved in the direction indicated by arrow 64, slide bar 84 and control arms 90 through 92 assume the position shown in FIG. 4A in which the extending tabs of control arms 90 through 92 are aligned with the smaller dimension portions of cruciform apertures 80 through 82 and are thus incapable of being pressed downwardly as buttons 40 through 42 are pressed. Thus, with slide bar 84 moved in the direction indicated by arrow 64, controls 40 through 42 are rendered inoperative.

With respect to volume control 70, it should be noted that the end portion of slide bar 84 defines an upwardly extending or raised cam 73. In the position shown in FIG. 3, cam 73 cooperates with tab 72 of volume control carriage 71 to overcome the bias force of spring 78 and lift carriage 71 upwardly in the direction indicated by arrow 67. When so lifted, thumb wheel 33 of volume control 70 extends beyond shoulders 30 and 31 and thus may be manipulated by the operator. Conversely, with slide bar 84 moved in the direction indicated by arrow 64, cam 73 is no longer aligned with tab 72 of carriage 71. In such case, frame 70 draws volume control carriage 71 downwardly in the direction indicated by arrow 68 until tab 72 rests upon the lower surface of slide bar 84. This downward movement of carriage 71 in the direction indicated by arrow 68 moves thumb wheel 33 downwardly below raised shoulders 30 and 31. Thus, thumb wheel 33 is no longer accessible. Thus, with slide bar 84 positioned in the manner shown in FIG. 3, control buttons 40 through 42 as well as volume control thumb wheel 33 are operable. If, however, slide bar 84 is allowed to return to its left most position due to the return force of spring 53 in the direction of arrow 64, control buttons 40 through 42 are inoperative and thumb wheel 33 of volume control 70 is lowered beneath shoulders 30 and 31 and is thus inaccessible to the child user.

FIGS. 4 and 4A set forth section views of control panel 21 taken along section lines 4—4 in FIG. 3. Thus, with simultaneous reference to FIGS. 4 and 4A, slide bar 84 defines an elongated rectangular member having a plurality of cruciform-shaped apertures 80, 81 and 82 defined therein. Slide bar 84 further defines a raised pedestal 83 which supports an upwardly lockout button 22. A bias spring 53 is coupled to pedestal 83 and urges slide bar 84 in the direction indicated by arrow 64. A plurality of control arms 90, 91 and 92 extend upwardly through apertures 80, 81 and 82 respectively. Control arm 90 defines a pair of outwardly extending tabs 85 and 95. Similarly, control arm 91 defines a pair of outwardly extending tabs 86 and 96 while control arm 92 defines a pair of outwardly extending tabs 87 and 97. It should be noted from examination of FIG. 4 that tabs 85 through 87 and 95 through 97 extend outwardly from control arms 90 through 92 a distance which is less than the clearance provided by the enlarged portions 103, 104 and 105 of cruciform apertures 80, 81 and 82 respectively. In addition, tabs 85 through 87 and 95 through 97 extend outwardly from their respective control arms for a distance greater than the remaining narrow portions of cruciform apertures 80 through 82.

Thus, with specific reference to FIG. 4, slide bar 84 is shown in the temporary relationship to control arms 90 through 92 which result from the user forcing lockout button 22 in the direction of arrow 69 and overcoming the force of spring 53. Thus, in the position of FIG. 4, the outwardly extending tabs of control arms 90 through 92 are aligned with enlarged portions 103, 104 and 105 respectively of cruciform apertures 80 through 82. Thus, in this position, slide bar 84 does not interfere with the movement of control arms 90 through 92 and their corresponding controls may be normally accessed.

FIG. 4A, however, sets forth the position of slide bar 84 when lockout button 22 is released and spring 5s draws slide bar 84 in the direction indicated by arrow 64. In the position of 4A, therefore, it will be apparent that the tabs extending outwardly from control arms 90 through 92 overlie the narrowed portions of cruciform apertures 80 through 82 respectively. Thus, in the lockout position shown in FIG. 4A, the downward motion of control arms 90 through 92 is prohibited by the interference of tabs 85 through 87 and 95 through 97 against slide bar 84.

FIGS. 5 and 5A set forth partially sectioned detailed views of an exemplary configuration for control buttons 40 through 42. It will be apparent to those skilled in the art that while FIGS. 5 and 5A set forth the detailed structure of control button 40, the descriptions in conjunction therewith are equally applicable to buttons 41 and 42. With simultaneous reference to FIGS. 5 and 5A, control panel 21 defines an aperture 50 and a pivot 110. Control button 40 extends upwardly through aperture 50 and defines a flange 46 which is received within pivot 110 to pivotally secure control button 40 within aperture 50. Flange 46 further defines a downwardly facing extension 56. Slide bar 84 defines a cruciform shaped aperture 80 having an enlarged portion 103 therein. Control arm 90 extends upwardly through aperture 80 and defines a pair of outwardly extending tabs 85 and 95. With specific reference to FIG. 5, slide bar 84 is shown in the position corresponding to FIG. 4 above. Accordingly, enlarged portion 103 of cruciform shaped aperture 80 are aligned with tabs 85 and 95. Thus, a downward pressure upon button 40 causes a corresponding downward force upon end 100 of control arm 90 which in turn moves control arm 90 downwardly in the direction of arrow 111. Because slide bar 84 is positioned in FIG. 5 in a manner aligning enlarged portion 103 with tabs 85 and 95, control arm 90 may be moved downwardly through aperture 80 and the underlying control coupled thereto (not shown) may be operated.

Conversely, and with specific reference to FIG. 5A, slide bar 84 is positioned in the alignment shown above in FIG. 4A. Correspondingly, tabs 85 and 95 overlie the narrowed portion of aperture 80 and downward force upon button 40 merely forces tabs 85 and 95 against slide bar 84 and no downward movement of control arm 90 results.

FIGS. 6 and 6A set forth section views of volume control carriage 71 and volume control 70 taken along section lines 6—6 in FIG. 3. With simultaneous reference to FIGS. 6 and 6A, control panel 21 defines a pair of upwardly extending cylindrical raised shoulders 30 and 31 and an elongated slot 32 therebetween. A volume control carriage 71 is slidably supported in alignment with slot 32 and is movable in the directions indicated by arrows 115 and 116. Volume control 70 includes a conventional rotationally operated volume control element 75 coupled to a rotatable thumb wheel 33. Volume control carriage 71 further includes a downwardly extending tab 72. As is better seen in FIG. 3, a bias spring 78 (better seen in FIG. 3) urges volume control carriage 71 downwardly in the direction indicated by arrow 116. Slide bar 84 is positioned beneath tab 72 and defines a raised cam portion 73.

With specific reference to FIG. 6, slide bar 84 is positioned with respect to volume control carriage 71 in the position shown in FIG. 3. Thus, tab 72 is brought into contact with cam 73 which in turn overcomes the force of spring 78 and moves volume control carriage 71 upwardly raising thumb wheel 33 above shoulders 30 and 31. In this position, volume control 70 may be adjusted by moving thumb wheel 33.

With reference to FIG. 6A, slide 84 is moved to the lockout position shown in FIG. 4A resulting in the removal of cam surface 73 from tab 72. Thus, in the absence of contact between tab 72 and cam 73, the force of spring 78 draws volume control carriage 71 downwardly in the direction indicated by arrow 116 which in turns lowers thumb wheel 33 beneath raised shoulders 30 and 31. Thus, in the position shown in FIG. 6A, volume control 70 is inaccessible to the user and volume adjustments are precluded.

What has been shown is a children's music player with control lockout in which a conventional audio player such as a audio-cassette player is supported within a housing which supports a pair of child operable buttons corresponding to on and off controls for the player. A lockout mechanism is operative upon the remaining controls which precludes the manipulation thereof by children. The mechanism shown is simple and effective and relatively inexpensive to manufacture.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. A children's music player comprising:
a housing defining an interior cavity;
an audio player for playing recorded audio information and having a plurality of control members;
an on/off control supported upon said housing and operative to activate and deactivate said audio player; and
lockout means operative to act upon said plurality of control members to render said control members inoperable by the child user,
said plurality of control members including a plurality of slidable control arms each terminating in a user depressible member, and said lockout means including an elongated slide bar interposed between said plurality of depressible members and said audio player, said slide bar movable to a first position interfering with the motion of at least one of said control arms and a second position not interfering with control arm motion.

2. A children's music player as set forth in claim 1 wherein said plurality of control members includes a volume control having a rotatable operating member, and wherein said lockout means includes a volume control carriage coupled to said slide bar, and movable thereby to a first position when said slide bar is moved to its first position in which said rotatable operating member is inaccessible to the user, and movable to a second position when said slide bar is moved to its second position in which said rotatable operating member is accessible to the user.

3. A children's music player as set forth in claim 2 wherein said slide bar defines a plurality of apertures and wherein said plurality of control arms extend therethrough.

4. A children's music player as set forth in claim 3 wherein said slide bar further defines a raised cam surface and wherein said volume control carriage defines a cooperating cam follower tab.

5. A children's music player as set forth in claim 4 wherein said apertures in said slide bar are slots having enlarged portions and non-enlarged portions and wherein said control arms each define outwardly extending tabs smaller than said enlarged portions of said slots and greater than said non-enlarged portions thereof.

6. A children's music player comprising:
a housing defining an interior cavity and exterior surface;
an audio player for producing audible sound;
a control panel defining a slot and supporting a plurality of control buttons;
a plurality of control arms coupled to said audio player and said control buttons for controlling a plurality of functions of said audio player;
an on button and an off button operatively coupled to said audio player and supported upon said external surface for turning the sound of said audio player on and off;
a volume control having a rotatable member;
a volume control carriage slidably supporting said volume control within said interior cavity such that said rotatable member is aligned with said slot; and
a slide bar, interposed between said player and said control buttons, having a plurality of apertures therein, through which said control arms pass, and define a cam surface for moving said volume control carriage to extend a portion of said rotatable member through said slot;
said bar member movable to a locking position to preclude operation of said control arms and withdrawing said rotatable member from said slot, and movable to a nonlocking position permitting operation of said control arms and extending a portion of said rotatable member through said slot.

7. A children's music player as set forth in claim 6 wherein said control panel defines a pair of raised portions one each side of said slot.

8. A children's music player as set forth in claim 7 wherein said control panel further defines an aperture and wherein said slide bar includes a lockout button extending through said aperture.

9. A children's music player as set forth in claim 8 including a first spring coupled to said slide bar urging said slide bar toward its lockout position.

10. A children's music player as set forth in claim 9 including a second spring coupled to said volume control carriage urging said volume control carriage away from said slot.

11. A children's music player comprising:
a housing defining an interior cavity;
an audio player for playing stored audio information and having a plurality of control members operable to alter the playing conditions of said stored audio information:
an on/off control supported upon said housing and operative to activate and deactivate said audio player; and
lockout means operative to prevent changes of said playing conditions by said child user,
said plurality of control members including a plurality of slidable control arms each terminating in a user depressible member, and said lockout means including an elongated slide bar interposed between said plurality of depressible members and said audio player, said slide bar movable to a first position interfering with the motion of at least one of said control arms and a second position not interfering with control arm motion.

12. A children's music player as set forth in claim 11 wherein said plurality of control member includes a volume control having a rotatable operating member, and wherein said lockout means includes a volume control carriage coupled to said slide bar, and movable thereby to a first position when said slide bar is moved to its first position in which said rotatable operating member is inaccessible to the user, and movable to a second position when said slide bar is moved to its second position in which said rotatable operating member is accessible to the user.

13. A children's music player as set forth in claim 12 wherein said slide bar defines a plurality of apertures and wherein said plurality of control arms extend therethrough.

14. A children's music player as set forth in claim 13 wherein said slide bar further defines a raised cam surface and wherein said volume control carriage defines a cooperating cam follower tab.

15. A children's music player as set forth in claim 14 wherein said apertures in said slide bar are slots having enlarged portions and non-enlarged portions and wherein said control arms each define outwardly extending tabs smaller than said enlarged portions of said slots and greater than said non-enlarged portions thereof.

* * * * *